(12) United States Patent
Huang

(10) Patent No.: US 10,327,618 B2
(45) Date of Patent: Jun. 25, 2019

(54) AUTOMATIC CLEANING SYSTEM AND CHARGING BASE

(71) Applicant: IBOT Robotic Co. Ltd., Taipei (TW)

(72) Inventor: Chun-Chieh Huang, Taipei (TW)

(73) Assignee: IBOT Robotic Co. Ltd., Taipei (TW)

(*) Notice: Subject to any disclaimer, the term of this patent is extended or adjusted under 35 U.S.C. 154(b) by 217 days.

(21) Appl. No.: 15/592,216

(22) Filed: May 11, 2017

(65) Prior Publication Data

US 2018/0235423 A1   Aug. 23, 2018

(30) Foreign Application Priority Data

Feb. 18, 2017   (TW) .............................. 106105490 A

(51) Int. Cl.
| | |
|---|---|
| *A47L 9/28* | (2006.01) |
| *A47L 11/40* | (2006.01) |
| *G01S 1/16* | (2006.01) |
| *G05D 1/02* | (2006.01) |
| *H02J 7/00* | (2006.01) |
| *H02J 7/04* | (2006.01) |

(52) U.S. Cl.
CPC ....... *A47L 11/4011* (2013.01); *A47L 11/4005* (2013.01); *G01S 1/16* (2013.01); *G05D 1/0219* (2013.01); *H02J 7/0042* (2013.01); *H02J 7/041* (2013.01); *A47L 2201/022* (2013.01); *A47L 2201/06* (2013.01); *H02J 2007/0096* (2013.01)

(58) Field of Classification Search
CPC .............. A47L 11/4005; A47L 11/4011; A47L 2201/022; A47L 2201/06; G01S 1/16; G05D 1/0219; H02J 7/0042; H02J 7/007
See application file for complete search history.

(56) References Cited

U.S. PATENT DOCUMENTS

| 7,332,890 | B2 | 2/2008 | Cohen et al. | |
|---|---|---|---|---|
| 8,572,799 | B2 | 11/2013 | Won et al. | |
| 2017/0231446 | A1* | 8/2017 | Watanabe | A47L 9/00 |
| | | | | 15/319 |
| 2017/0231452 | A1* | 8/2017 | Saito | A47L 9/28 |
| | | | | 15/319 |
| 2017/0235309 | A1* | 8/2017 | Nakanishi | A47L 9/28 |
| | | | | 15/319 |
| 2017/0273528 | A1* | 9/2017 | Watanabe | A47L 9/00 |

FOREIGN PATENT DOCUMENTS

| CN | 205335915 | 6/2016 |
|---|---|---|
| TW | M453295 | 5/2013 |

* cited by examiner

*Primary Examiner* — Khoi H Tran
*Assistant Examiner* — Robert T Nguyen
(74) *Attorney, Agent, or Firm* — Patterson + Sheridan, LLP

(57) ABSTRACT

An automatic cleaning system including a charging base and a cleaning robot is provided. The charging base includes a signal transmitter and a power supply portion. The charging base determines whether to transmit a start signal by the signal transmitter according to a preset time. The cleaning robot includes a signal receiver and a power receiving portion. The power receiving portion is configured to be electrically connected to the power supply portion of the charging base when the cleaning robot performs a charging operation. When the signal receiver receives the start signal, the cleaning robot leaves the charging base, and performs a cleaning operation. In addition, a charging base suitable for charging an automatic cleaning device is also provided.

10 Claims, 3 Drawing Sheets

AUTOMATIC CLEANING SYSTEM AND CHARGING BASE

CROSS-REFERENCE TO RELATED APPLICATION

This application claims the priority benefit of Taiwan application serial no. 106105490, filed on Feb. 18, 2017. The entirety of the above-mentioned patent application is hereby incorporated by reference herein and made a part of this specification.

BACKGROUND OF THE INVENTION

Field of the Invention

The invention relates to an automatic control technique and particularly relates to an automatic cleaning system and a charging base.

Description of Related Art

In the technical field of cleaning robots, currently there are more and more researches and designs regarding how to build a cleaning robot with automatic cleaning and charging functions so as to provide a cleaning service of high efficiency. However, even though the current cleaning robot has already been able to perform a cleaning operation effectively thanks to the design of various automatic moving modes and may return to the charging base to perform a charging operation, a user still needs to start the cleaning robot by himself or herself so that the cleaning robot may perform the cleaning operation. Therefore, an important issue at present is how to design a cleaning robot capable of automatically starting the cleaning operation in an efficient way so that the cleaning robot has the function of performing an automatic cleaning operation at any time according to the user's needs.

SUMMARY OF THE INVENTION

The invention provides an automatic cleaning system and a charging base. The charging base is configured to set up a preset time and determines whether to start a cleaning robot to automatically perform a cleaning operation according to the preset time, so that the automatic cleaning system has the function of performing an automatic cleaning operation at any preset time according to the user's needs.

The automatic cleaning system of the invention includes a charging base and a cleaning robot. The charging base includes at least one signal transmitter and a power supply portion. The charging base determines whether to transmit at least one start signal by the at least one signal transmitter according to a preset time. The cleaning robot includes a signal receiver and a power receiving portion. The power receiving portion is configured to be electrically connected to the power supply portion of the charging base when the cleaning robot performs a charging operation. And when the signal receiver receives the at least one start signal, the cleaning robot leaves the charging base and performs a cleaning operation.

In an embodiment of the invention, the charging base determines whether to enable the at least one signal transmitter according to whether a clock time reaches the preset time, so that the at least one signal transmitter transmits the at least one start signal.

In an embodiment of the invention, the charging base further includes a control component, and the control component is configured to output a control signal so that the charging base sets up the preset time according to the control signal.

In an embodiment of the invention, the charging base further includes a timing device configured to set up the preset time, and the charging base determines whether to enable the at least one signal transmitter to transmit the at least one start signal according to the preset time.

In an embodiment of the invention, the at least one signal transmitter includes a first signal transmitter and a second signal transmitter respectively provided on a side surface of the charging base and disposed on a same horizontal line.

The charging base of the invention is suitable for charging an automatic cleaning device. The charging base includes a power supply portion and at least one signal transmitter. The power supply portion is provided on a side surface of the charging base. The power supply portion is configured to be electrically connected to a power receiving portion of the automatic cleaning device when the automatic cleaning device performs a charging operation. The at least one signal transmitter is provided inside the power supply portion and is configured to determine whether to transmit at least one start signal according to a preset time so that the automatic cleaning device, after receiving the at least one start signal, leaves the charging base and performs a cleaning operation.

In an embodiment of the invention, the charging base determines whether to enable the at least one signal transmitter according to whether a clock time reaches the preset time, so that the at least one signal transmitter transmits the at least one start signal.

In an embodiment of the invention, the charging base further includes a control component, and the control component is configured to output a control signal so that the charging base sets up the preset time according to the control signal.

In an embodiment of the invention, the charging base further includes a timing device configured to set up the preset time, and the charging base determines whether to enable the at least one signal transmitter to transmit the at least one start signal according to the preset time.

In an embodiment of the invention, the at least one signal transmitter includes a first signal transmitter and a second signal transmitter respectively provided on a side surface of the charging base and disposed on a same horizontal line.

Based on the above, the automatic cleaning system and the charging base of the invention are configured to set up a preset time and start the signal transmitter according to whether the clock time has reached the preset time so as to transmit a start signal by the signal transmitter. The cleaning robot of the automatic cleaning system docks at the charging base to perform the charging operation. Besides, when the cleaning robot receives the start signal, the cleaning robot leaves the charging base and performs the cleaning operation. In other words, the automatic cleaning system of the invention has the function of performing an automatic cleaning operation according to the preset time that is set based on the user's needs.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following, a plurality of embodiments are provided to illustrate the invention. However, the invention is not limited to the illustrated embodiments and the embodiments are allowed to be combined with one another when appropriate. The phrase "electrically connected" used throughout this specification (including the claims) may refer to any direct or indirect connection means. For example, if it is described that the first device is electrically connected to the second device, it should be understood that the first device may be directly connected to the second device or indirectly connected to the second device through other devices or certain connection means.

Figure 1:
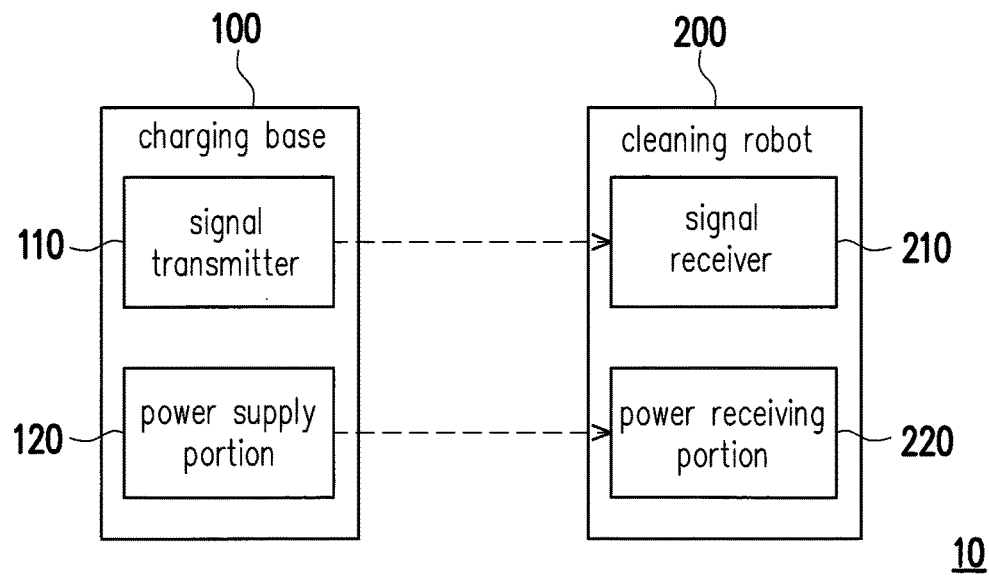
FIG. 1 illustrates a block diagram of an automatic cleaning system according to an embodiment of the invention.

FIG. 1 illustrates a block diagram of an automatic cleaning system according to an embodiment of the invention. With reference to FIG. 1, an automatic cleaning system 10 includes a charging base 100 and a cleaning robot 200. The charging base 100 includes a signal transmitter 110 and a power supply portion 120. Here the charging base 100 may be provided on a wall surface. The cleaning robot 200 includes a signal receiver 210 and a power receiving portion 220. Here the cleaning robot 200 is a self-propelled moveable device.

In this embodiment, when the cleaning robot 200 performs a charging operation, the power supply portion 120 is configured to be electrically connected to the power receiving portion 220 of the cleaning robot 200. In this embodiment, the charging base 100 may set up a preset time and determine whether to transmit a start signal by the signal transmitter 110 according to the preset time. Moreover, after the cleaning robot 200 receives the start signal, the cleaning robot 200 leaves the charging base 100. In other words, in this embodiment, the charging base 100 may set up a preset time to determine a time table for the cleaning robot 200 to perform a cleaning operation. For example, a user may operate the charging base 100 to set time at, for example, ten o'clock in the morning. When a clock time of the charging base 100 reaches the preset time, the signal transmitter 110 of the charging base 100 then transmits the start signal to inform the cleaning robot 200 to automatically leave the charging base 100 and automatically perform the cleaning operation. It is worth noticing that when the clock time of the charging base 100 reaches the preset time, the cleaning robot 200 then stops charging and performs the cleaning operation no matter whether the cleaning robot 200 has already completed the charging operation or not. In addition, the number of the signal transmitter 110 is at least one. In one embodiment, the signal transmitter 100 may be two signal transmitters configured to transmit the same start signal.

Figure 2:
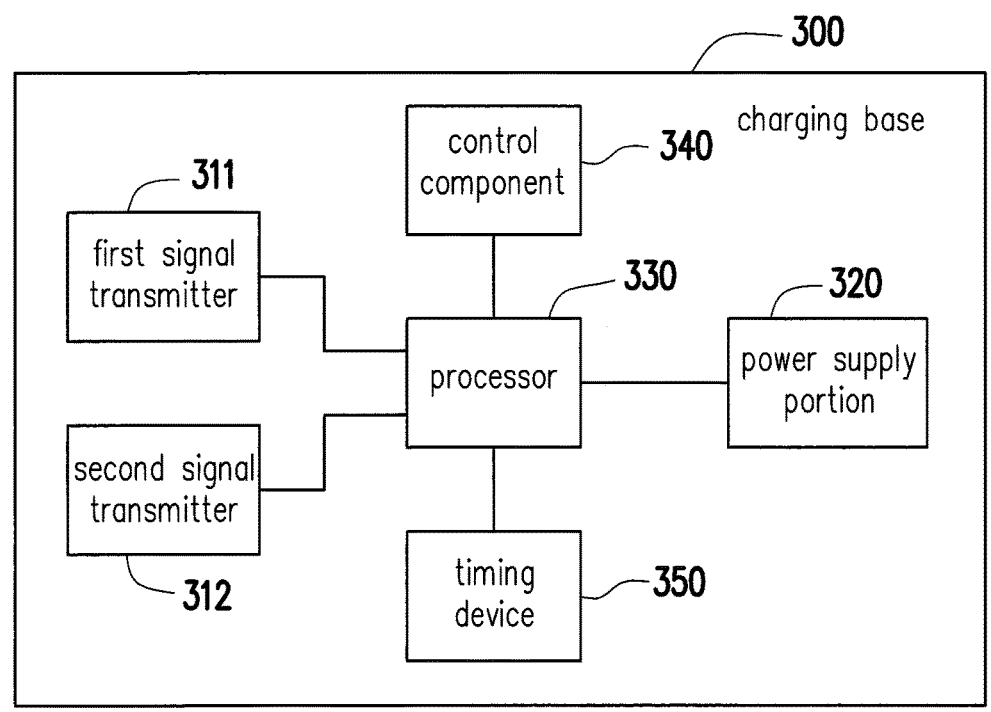
FIG. 2 illustrates a block diagram of a charging base according to an embodiment of the invention.

FIG. 2 illustrates a block diagram of a charging base according to an embodiment of the invention. With reference to FIG. 2, a charging base 300 includes a first signal transmitter 311, a second signal transmitter 312, a power supply portion 320, a processor 330, a control component 340 and a timing device 350. In this embodiment, by the processor 330, the charging base 300 may control the first signal transmitter 311 and the second signal transmitter 312 to transmit a start signal, and receives a control signal provided by the control component 340 to set up a clock time or a preset time. In this embodiment, the timing device 350 may determine a set time by pressing a button, such as pressing once so as to enable the first signal transmitter 311 and the second signal transmitter 312 to transmit two start signals one or two hours later, but the invention is not limited thereto. Moreover, in one embodiment, the timing device 350 may further include a display to show the set time. In other words, the charging base 300 sets up the preset time by the timing device 350 and shows the clock time or the preset time via the display. Besides, the processor 330 may further control if the power supply portion 320 supplies electricity. The invention is not limited thereto.

In this embodiment, the first signal transmitter 311 and the second signal transmitter 312 may be infrared signal transmitters, but the invention is not limited thereto. In one embodiment, the first signal transmitter 311 and the second signal transmitter 312 may also be other signal transmitters of different wavelengths or ultrasound transmitters. The first signal transmitter 311 and the second signal transmitter 312 may be provided on a side surface of the charging base and correspond to the position of the signal receiver when the cleaning robot docks at the charging base.

In this embodiment, the power supply portion 320 may provide direct current to the power receiving portion of the cleaning robot, and the cleaning robot may further include a battery module. The power supply portion 320 may be connected to mains electricity that provides alternating current and converts the alternating current into direct current. When the cleaning robot docks at the charging base 300, the power supply portion 320 may be electrically connected to the power receiving portion of the cleaning robot and provide the direct current to the cleaning robot so that the cleaning robot performs a charging operation to the battery module. In this embodiment, the power supply portion 320 may have two metal plates to serve as a positive electrode and a negative electrode. In one embodiment, after the cleaning robot completes the charging operation or receives the start signal, the power supply portion 320 of the charging base 300 then stops outputting electric power.

In this embodiment, the processor 330 is, for example, a central processing unit (CPU) or other programmable general-purpose or special-purpose microprocessor, digital signal processor (DSP), programmable logic controller (PLC), application specific integrated circuits (ASIC), programmable logic device (PLD) or other similar devices or a combination thereof. By the way, the cleaning robot of each of the embodiments of the invention also has a processor for performing the charging operation and the cleaning operation and may determine the operation mode based on whether the start signal is received.

In this embodiment, the control component 340 may be a button component or a switch component. The control component 340 may allow the user to exercise control by way of pressing or touching and output the control signal to the processor 320 according to the control result of the user. In this embodiment, the user may set up the clock time or the preset time by the control component 340, and here the clock time may be the time of the current time zone or a time set up by the user himself or herself.

In this embodiment, the above display may be a four-digit seven-segment display so as to show a four-digit number. In other words, the timing device 350 may show time digits via the display, and the time digits may be switched or adjusted by the control component 340 to display the clock time or the preset time, but the invention is not limited thereto. In one embodiment, the above display may also be other kinds of display such as a liquid crystal display (LCD) or a light emitting diode display (LED display). Or, in another embodiment, the above display may also be a touch panel, and the control component 340 may also be a touch module disposed inside the above display so that the user may directly touch the display to set up time of the timing device.

In order to allow those ordinarily skilled in the art to comprehend the automatic cleaning system and the time setting function and mechanism characteristics of the charging base in the invention even more, a plurality of embodiments are provided below to illustrate the invention.

Figure 3A:
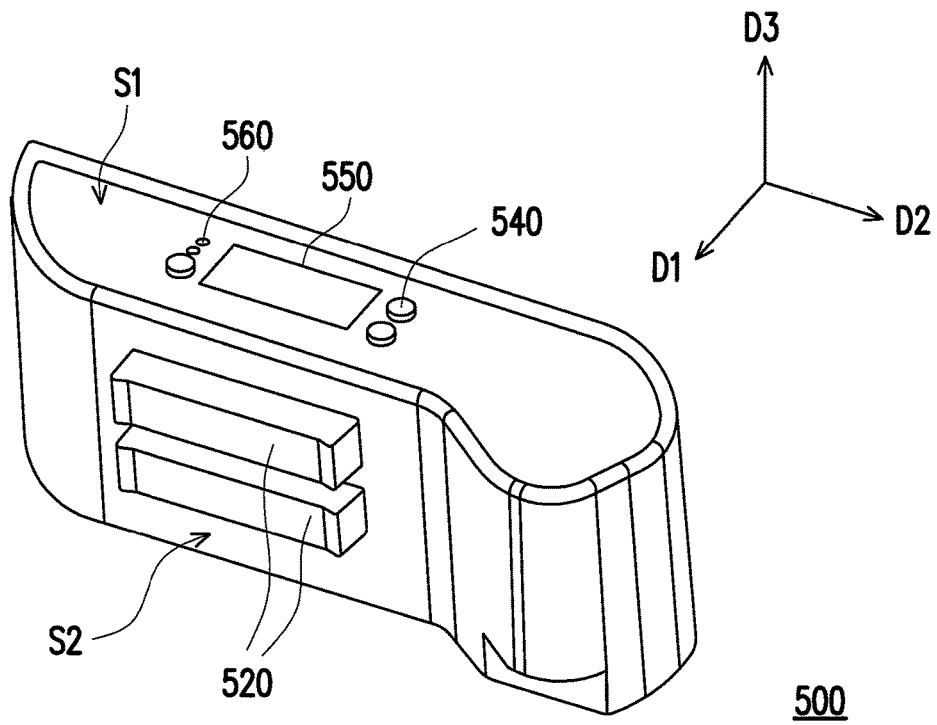
FIG. 3A illustrates a top view of a charging base according to an embodiment of the invention.
Figure 3B:
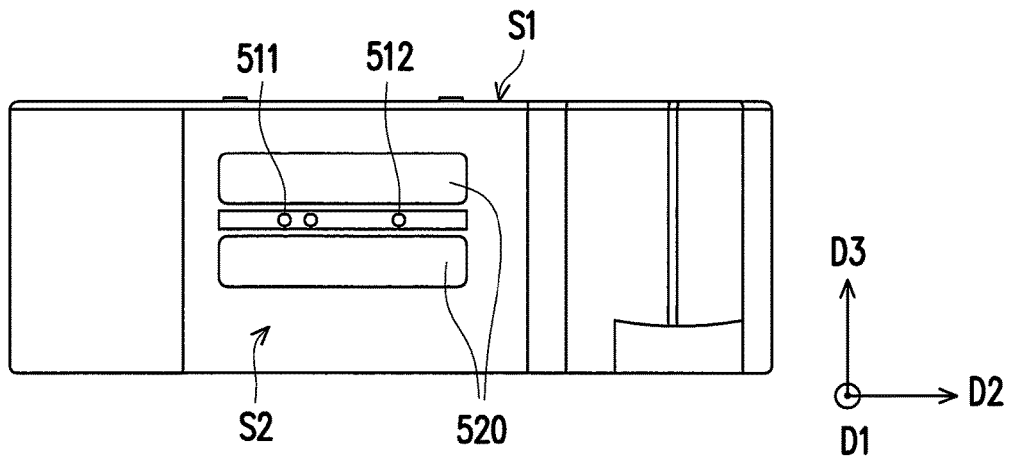
FIG. 3B illustrates a side view of the charging base according to an embodiment of the invention.

FIG. 3A illustrates a top view of a charging base according to an embodiment of the invention. FIG. 3B illustrates a side view of the charging base according to an embodiment of the invention. In this embodiment, a first direction D1, a second direction D2 and a third direction D3 are perpendicular to one another. With reference to FIG. 3A, a top surface S1 of a charging base 500 is provided with a control component 540, a display 550 and a light emitting component 560. In addition, the charging base 500 is further provided with a timing device and shows time via the display 550. In this embodiment, the charging base 500 may include a plurality of the control components 540 configured to set up time or switch display contents respectively. For example, at least one of the control components 540 may be configured to switch the display 550 to show either a clock time or a preset time, and light may be emitted alternately via two light emitting components 560 to respectively represent the two display contents. In this embodiment, a side surface S2 of the charging base 500 is provided with a power supply portion 520. The power supply portion 520 has two metal plates of a positive electrode and of a negative electrode, so that when a cleaning robot docks at the charging base 500 along the first direction D1, the power supply portion 520 may be electrically connected to a power receiving portion of the cleaning robot so as to charge the cleaning robot. Besides, in this embodiment, the charging base 500 may be disposed on a wall surface, which is a plane formed by the second direction D2 and the third direction D3.

With reference to FIG. 3B, a first signal transmitter 511 and a second signal transmitter 512 are provided between the two electrodes of the power supply portion 520, and are disposed on the same horizontal line along the second direction D2, but the invention is not limited thereto. In one embodiment, the first signal transmitter 511 and the second signal transmitter 512 may also be disposed on different horizontal lines along the third direction D3 so as to attain different heights from the ground. It is worth noticing that the power receiving portion of the cleaning robot does not necessarily face the power supply portion 520 of the charging base 500 squarely when the cleaning robot docks at the charging base 500. Therefore, in this embodiment, the charging base 500 may be designed to be provided with the power supply portion 520 that has a width greater than a width of the power receiving portion of the cleaning robot, so that the power receiving portion of the cleaning robot may still be electrically connected to the power supply portion 520 of the charging base 500 if the power receiving portion of the cleaning robot corresponds to the power supply portion 520 within specific skewed angles in the first direction D1, or if the power receiving portion does not face the power supply portion 520 squarely in the second direction D2.

In this embodiment, the first signal transmitter 511 and the second signal transmitter 512 are provided separately from each other at a fixed distance. In other words, the first signal transmitter 511 and the second signal transmitter 512 may provide a larger signal range so as to ensure that a signal receiver of the cleaning robot in each of the above scenarios may receive a start signal transmitted by at least one of the first signal transmitter 511 and the second signal transmitter 512.

Figure 4:
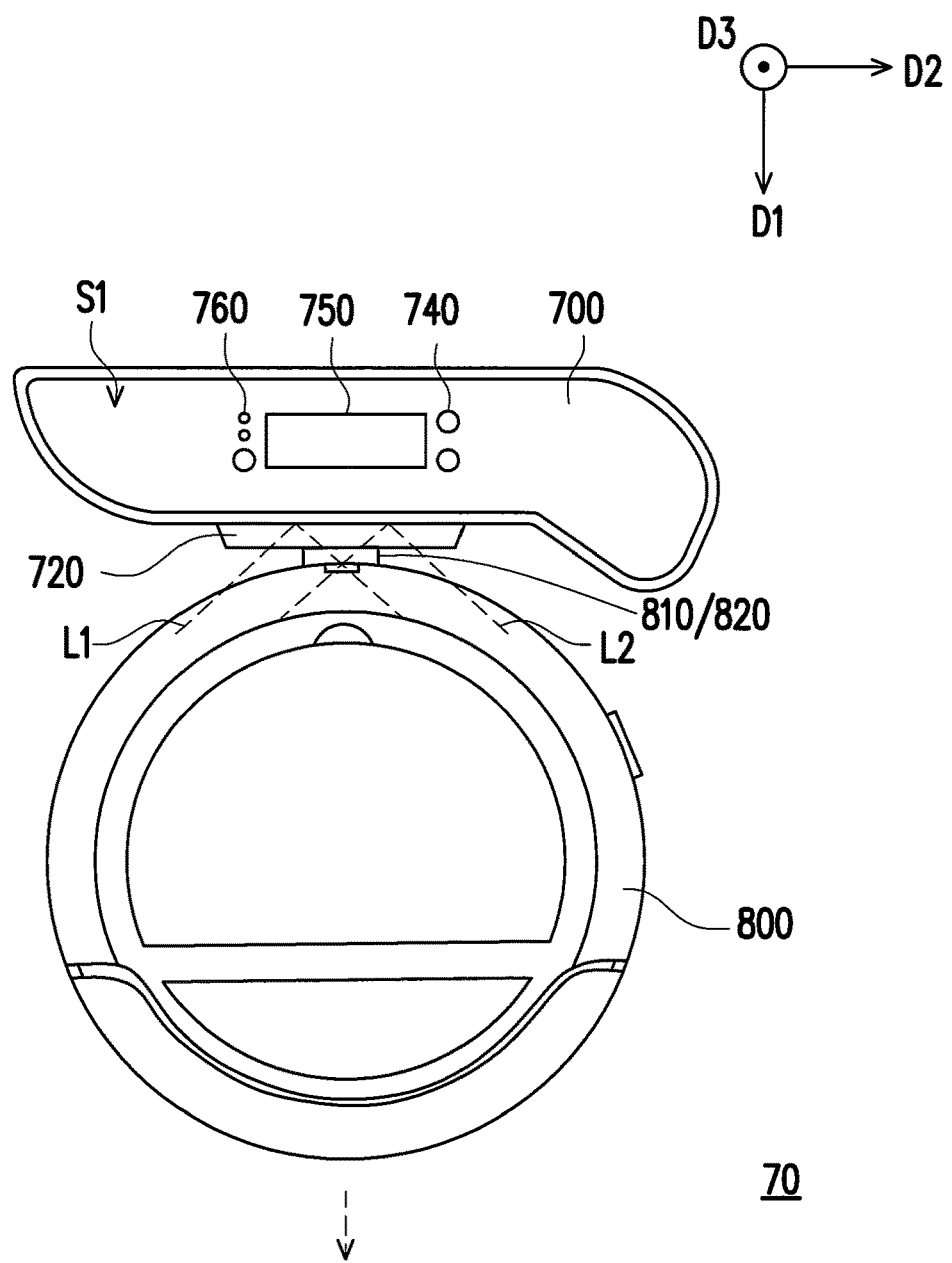
FIG. 4 illustrates a schematic view of an automatic cleaning system according an embodiment of the invention.

FIG. 4 illustrates a schematic view of an automatic cleaning system according an embodiment of the invention. With reference to FIG. 4, an automatic cleaning system 70 includes a charging base 700 and a cleaning robot 800. In this embodiment, the charging base 700 may be provided on a wall surface formed by the first direction D1 and the third direction D3, and the cleaning robot 800 may walk on a ground surface formed by the first direction D1 and the second direction D2. In this embodiment, a rear end portion of the cleaning robot 800 is provided with a signal receiver 810 and a power receiving portion 820. When the cleaning robot 800 returns to the charging base 700, the cleaning robot 800 walks backwards to dock at the charging base 700 so that a power supply portion 720 is electrically connected to the power receiving portion 820. After the cleaning robot 800 receives at least one of a start signal L1 and a start signal L2, the cleaning robot 800 then leaves the charging base 700 toward the second direction D2.

As shown in FIG. 4, after the cleaning robot returns to be recharged, the cleaning robot 800 may dock at the charging base 700. The power supply portion 720 of the charging base 700 is electrically connected to the power receiving portion 820 of the cleaning robot 800. In this embodiment, the charging base 700 has a plurality of control components 740, a display 750 and a light emitting component 760. The display 750 is a four-digit seven-segment display. In addition, the charging base 700 is further provided with a timing device and the plurality of control components 740 configured to set up time or switch display contents of the display 750 respectively. For example, at least one of the control components 740 may be configured to switch the display 750 to show either a clock time or a preset time, and light may be emitted alternately via two light emitting components 760 to respectively indicate the current display contents shown by the display 750.

In this embodiment, when the clock time of the charging base 700 reaches the preset time, the timing device of the charging base 700 may enable two signal transmitters so that the charging base 700 transmits the two start signals L1 and L2. By the two start signals L1 and L2, the charging base 700 informs the cleaning robot 800 to automatically leave the charging base 700 and automatically perform a cleaning operation. In this embodiment, the two signal transmitter of the charging base 700 may transmit the two start signals L1 and L2 either simultaneously or at different times. After the cleaning robot 800 leaves the charging base 700, the two signal transmitters of the charging base 700 then stop transmitting the start signal L1 and the start signal L2.

It is worth noticing that the start signal L1 and the start signal L2 transmitted by the charging base 700 may be identical or different start signals. Besides, because the charging base 700 may transmit the two start signals L1 and L2 simultaneously, the combined transmission angle becomes wider so as to provide a larger signal receiving range to ensure that the signal receiver 810 of the cleaning robot 800 may receive at least one of the start signal L1 and the start signal L2. When the signal receiver 810 of the cleaning robot 800 receives at least one of the start signal L1 and the start signal L2, the cleaning robot 800 then leaves the charging base 700 and performs the cleaning operation. In other words, when the clock time of the charging base 700 reaches the preset time, the cleaning robot 800 then stops charging and performs the cleaning operation no matter whether the cleaning robot 800 has completed the charging operation or not.

In this embodiment, when the cleaning robot 800 docks at the charging base 700, the power receiving portion 820 of the cleaning robot 800 does not necessarily face the power supply portion 720 of the charging base 700 squarely. Therefore, in this embodiment, the power supply portion 720 of the charging base 700 has a width greater than a width of the power receiving portion 820 of the cleaning robot 800 in the second direction D2, so that the power receiving portion 820 of the cleaning robot 800 may still be electrically connected to the power supply portion 720 of the charging base 700 if the power receiving portion 820 of the cleaning robot 800 corresponds to the power supply portion 720 within specific skewed angles in the first direction D1, or if the power receiving portion 820 does not face the power supply portion 720 squarely in the second direction D2.

In this embodiment, the cleaning robot 800 may further include a cleaning module, such as a vacuum motor, a broom for sweeping or a rag for mopping. The invention is not limited thereto. The cleaning robot 800 may further include a battery module for providing electric power and for providing a power storage function. When the cleaning robot 800 performs the cleaning operation, if the power of the battery module is lower than a preset threshold value, the cleaning robot 800 may automatically return to the charging base 700 to perform a charging operation. However, in one embodiment, the cleaning robot may also perform the return operation by a user, such as by the user pressing a button or using a remote control. In this embodiment, since those ordinarily skilled in the art are able to attain enough teachings, suggestions and implementation details regarding a variety of circuit components and mechanism characteristics of the cleaning robot 800, detailed description thereof is omitted here. Besides, the cleaning operation described in each of the above embodiments means that the cleaning robot 800 automatically walks on the ground and performs cleaning by the cleaning module. In addition, since those ordinarily skilled in the art are able to attain enough teachings, suggestions and implementation details regarding the automatic cleaning method of the cleaning robot 800 and its moving pattern of returning to the charging base 700, detailed description thereof is omitted here.

In summary of the above, the automatic cleaning system and the charging base of the invention are configured to set up a preset time and start the signal transmitter according to whether the clock time has reached the preset time so as to transmit a start signal by the signal transmitter. The cleaning robot of the automatic cleaning system docks at the charging base to perform the charging operation. Besides, the charging base of the invention is provided with one signal transmitter or a plurality of signal transmitters to ensure that the signal receiver of the cleaning robot receives the start signal. And when the cleaning robot receives the start signal, the cleaning robot leaves the charging base and performs the cleaning operation. In other words, the automatic cleaning system of the invention has the function of performing an automatic cleaning operation according to the preset time that is set based on the user's needs.

Although the embodiments are already disclosed as above, these embodiments should not be construed as limitations on the scope of the invention. It will be apparent to those ordinarily skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A charging base suitable for charging an automatic cleaning device, comprising:
   a power supply portion provided on a side surface of the charging base and configured to be electrically connected to a power receiving portion of the automatic cleaning device when the automatic cleaning device performs a charging operation; and
   at least one signal transmitter provided inside the power supply portion and configured to determine whether to transmit at least one start signal according to a preset time so that the automatic cleaning device, after receiving the at least one start signal, leaves the charging base and performs a cleaning operation.

2. The charging base as recited in claim 1, wherein the charging base determines whether to enable the at least one signal transmitter according to whether a clock time reaches the preset time, so that the at least one signal transmitter transmits the at least one start signal.

3. The charging base as recited in claim 1, wherein the charging base further comprises a control component, and the control component is configured to output a control signal so that the charging base sets up the preset time according to the control signal.

4. The charging base as recited in claim 1, wherein the charging base further comprises a timing device configured to set up the preset time, and the charging base determines whether to enable the at least one signal transmitter to transmit the at least one start signal according to the preset time.

5. The charging base as recited in claim 1, wherein the at least one signal transmitter comprises a first signal transmitter and a second signal transmitter respectively provided on a side surface of the charging base and disposed on a same horizontal line.

6. An automatic cleaning system, comprising:
   a charging base that comprises at least one signal transmitter and a power supply portion, wherein the charging base determines whether to transmit at least one start signal by the at least one signal transmitter according to a preset time; and
   a cleaning robot that comprises a signal receiver and a power receiving portion, wherein the power receiving portion is configured to be electrically connected to the power supply portion of the charging base when the cleaning robot performs a charging operation, and when the signal receiver receives the at least one start signal, the cleaning robot leaves the charging base and performs a cleaning operation.

7. The automatic cleaning system as recited in claim 6, wherein the charging base determines whether to enable the at least one signal transmitter according to whether a clock time reaches the preset time, so that the at least one signal transmitter transmits the at least one start signal.

8. The automatic cleaning system as recited in claim 6, wherein the charging base further comprises a control component, and the control component is configured to output a control signal so that the charging base sets up the preset time according to the control signal.

9. The automatic cleaning system as recited in claim 6, wherein the charging base further comprises a timing device configured to set up the preset time, and the charging base determines whether to enable the at least one signal transmitter to transmit the at least one start signal according to the preset time.

10. The automatic cleaning system as recited in claim 6, wherein the at least one signal transmitter comprises a first signal transmitter and a second signal transmitter respectively provided on a side surface of the charging base and disposed on a same horizontal line.

\* \* \* \* \*